March 1, 1927.  
C. J. SCUDDER  
1,619,588
CONNECTING ROD BEARING
Filed Feb. 19, 1926
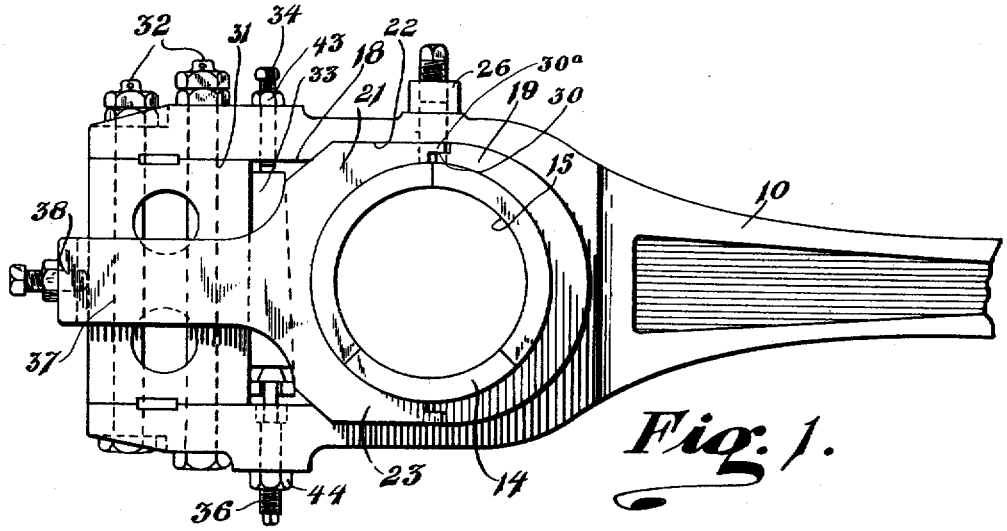
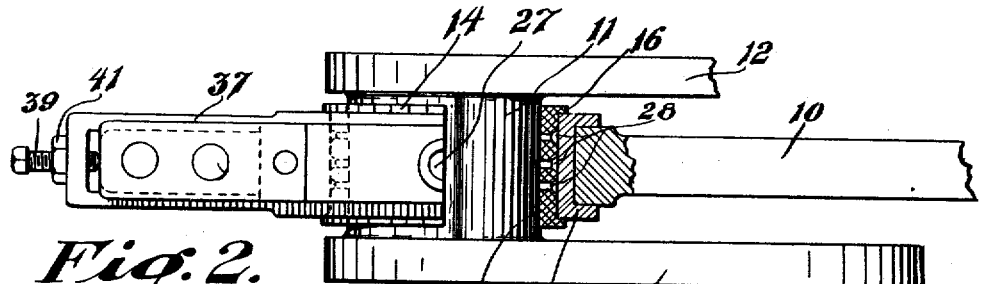
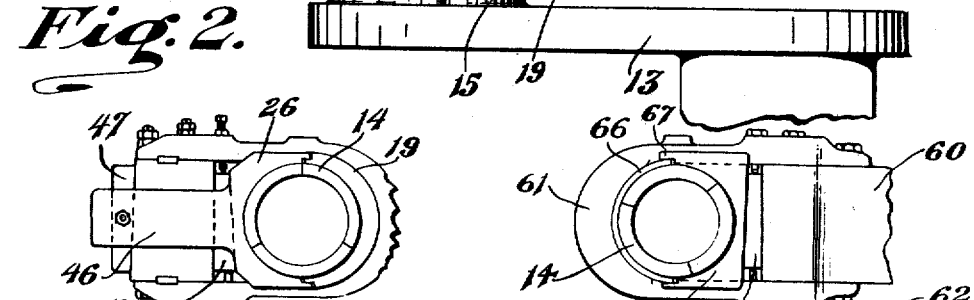
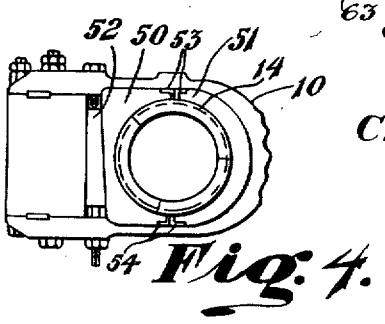
Chas. J. Scudder
INVENTOR
WITNESSES:
BY Henry L. Jennings
ATTORNEY Patented Mar. 1, 1927.

1,619,588

UNITED STATES PATENT OFFICE.

CHARLES J. SCUDDER, OF SCRANTON, PENNSYLVANIA.

CONNECTING-ROD BEARING.

Application filed February 19, 1926. Serial No. 89,270.

My invention relates to bearings, more particularly to connecting rod bearings, and has for its object the provision of an improved bearing member having the maximum of bearing surface together with means for adjusting for wear of said member whereby it may run for long periods of time without the necessity of renewal.

Apparatus embodying features of my invention is illustrated in the accompanying drawing, forming a part of this application, wherein Fig. 1 is a view in elevation of a connecting rod having my improved bearing structure applied thereto; Fig. 2 is a plan view, partly in section, of a crank pin and connecting rod with the bearing shown in Fig. 1; Fig. 3 shows an alternative method of locking means employed with my invention; Fig. 4 shows, in elevation, a modified form of my invention; and Fig. 5 shows a further modification thereof.

As is well known in the art to which my invention relates, connecting rod bearing members receiving reciprocating thrusts tend to wear out of round, making it extremely difficult to so adjust them as to permit of an even bearing surface around the pin, and leading to frequent renewal of the bearing members due to the difficulty of obtaining proper adjustment. In order to overcome this difficulty, it has already been proposed to form the bearing in the manner of a floating bushing fitting around the crank pin and inside a suitable recess in the connecting rod, said bearing member having inner and outer bearing surfaces either flat or spherical, as desired, so as to permit it to turn freely within the connecting rod and around the crank pin. This form of bearing member also has the advantage of diminishing the frictional contact between the crank pin and the bearing member or bushing and permits it to be distributed between the crank pin and the connecting rod, thus preventing the bushing and pin from heating as quickly as would otherwise be the case. With this construction, however, no means have hitherto been provided whereby wear of the floating bushing could be compensated for and it has been necessary, when a certain degree of wear has taken place, to entirely renew the bearing member.

These and other difficulties are overcome in accordance with my invention wherein I provide a divided bearing member cooperating between a connecting rod and a crank pin, with retaining means cooperating between the rod and the bearing member whereby it is free to turn within the retaining means. The retaining means are divided, and means are provided for adjusting the parts of said retaining means so as to clasp the bearing member more tightly and thus compensate for wear. In addition I provide means whereby, once the retaining means and bearing member are properly adjusted, the parts are locked in place thus preventing any loosening of the retaining means. In order that the bearing member may have the maximum of bearing contact with its associated surfaces it is preferably divided into three parts.

Referring now to the drawing for a better understanding of my invention I show a connecting rod 10 and a crank pin 11, said crank pin having crank arms 12 and 13 on opposite ends thereof. Surrounding the crank pin 11 is a bearing member 14 having a circular inner bearing surface 15 and a circular outer bearing surface 16. The bearing member 14 is divided into three parts, so as to permit of its assembly on a crank pin such as shown and also to permit of its adjustment and to insure the maximum of bearing contact with the crank pin 11.

Within the connecting rod 10 is provided a recess 18. Within the recess 18 is located retaining means for the bearing member 14, said retaining means comprising two parts 19 and 21. For a reason which will become more apparent in the reading of this specification, the part 19 of the retaining means is preferably joined solidly with the connecting rod 10, as by welding. The recess 18 is provided at the top and bottom with plane surfaces 22 and 23 and the top and bottom surfaces of the parts of the retaining means 21 are also plane surfaces to cooperate with the plane surfaces of the recess and prevent turning of the retaining means in the connecting rod. The parts 19 and 21 of the retaining means are provided with inner circular surfaces cooperating with the outer bearing surface of the bearing member 14, so that said bearing member is free to turn therein. At 26 is shown a grease cup connecting with a hole 27 extending downwardly into the recess 18 and through the retaining means, whereby lubricant is fed downwardly on top of the bearing member 14, lubricating the cooperating bearing surfaces on the inside of the retaining means and outside of the bearing member. Provided in the bearing member are a plurality of passages 28—28 which permit lubricant to pass through said bearing member to the crank pin 11.

At 31 I show a closure member for the end of the connecting rod, said closure member being held in place by suitable bolts 32—32 passing through the end of the connecting rod and the closure member. Cooperating between the closure member 31 and the part 21 of the retaining means is a wedge member 33. An upper adjusting screw 34 is effective for moving the wedge member downwardly and a lower adjusting screw 36 is effective for moving the wedge member upwardly, said screw means being operable in a manner well understood in the art. When the wedge member is forced upwardly it will be seen that it forces the part 21 of the retaining means to the right, causing said retaining means to clasp the bearing member 14 more tightly and thus serves as an adjustment for compensating for wear of the bearing member.

I have found however that the form of adjustment so far described, while fully compensating for wear of the bushing, may be improved upon, especially where heavy reciprocating thrusts are imposed upon the bearing member and the parts of the bearing structure are necessarily of heavy construction, such for example as the bearing structure for locomotive main rods. A particular part of my invention consists in providing a means for pulling the parts of the retaining means farther apart and locking them in position, as well as employing the wedge means 33 to move them closer together. This construction prevents any back lash or loosening up in service of the adjusting section 21 of the retaining means and renders the adjustment more secure, once it is made.

To this end I provide on the left of the part 21 of the retaining means, as seen in the drawing, a strap 37 extending toward the end of the connecting rod 10 and embracing the closure member 31. Provided in the strap 37 is a threaded hole 38 having a set screw 39 which bears against the end of the closure member 31. A locking nut 41 is provided on the set screw 39 so that when the part 21 of the retaining means is placed in the desired position it may be permanently locked in place. It will be apparent that when the set screw 39 is screwed farther into the strap 37, and with the wedge 33 slacked off, it is effective to pull the part 21 of the retaining means away from the part 19. With this arrangement, if the bearing member has been adjusted too tightly and warms up and there should be a tendency of the part 21 to stick in the recess of the connecting rod, the set screw 31 is effective to loosen the part 21 as well as effect a looser adjustment of the bearing member 14. When the parts are finally satisfactorily adjusted, either in compensating for wear or in slacking off a too tight adjustment, the wedge member 33 is locked in position by means of lock nuts 43 and 44 and the set screw 39 is locked in position by means of a lock nut 41. The adjusted members then form a bearing structure with the interrelation of the parts fixed, leaving the bearing member 14 with a proper fit around the crank pin 11 and with that degree of freedom necessary for it to turn within the retaining means. I have further found that, as the bearing member and its associated parts assume a higher temperature in service, there is a tendency for the upper and lower branches of the part 21 of the retaining means to close in somewhat and clasp the bearing member 14 more tightly. This action has a tendency to prevent the free turning of the bearing member 14 in the retaining means. In order to overcome this latter tendency I provide a recess 30 in the part 19 of the retaining means and a tongue 30$^a$ on the part 21 of the retaining means overlapping or extending into the recess. Inasmuch as the part 19 is solidly secured in the rod 10, the interfitting of the tongue 30$^a$ and recess 30 prevents the upper and lower branches of the part 21 of the retaining means from further closing in.

Referring now to Fig. 3, I show a modified means for holding the part 21 of the retaining means in a fixed position after adjustment. In accordance with this modification, the part 21 of the retaining means is provided with a strap 46 somewhat wider in construction than the strap 37 previously described. Inserted between the strap member 46 and the closure member 45 is a wedge member 47 effective for moving the part 21 of the retaining means to the left as shown in the drawing. After adjustment the wedge member 47 is secured in position as by a set screw 48.

As in the previously described embodiment, the wedge 33 is employed for bringing the parts of the retaining means closer together, while the wedge 47 is employed for forcing them farther apart. After adjustment the parts are finally locked in place leaving the bearing member 14 free to turn in the retaining means and around the pin 11.

Referring now to Fig. 4, I show a connecting rod 10 and bearing member 14 as before. Interposed between the bearing member 14 and the rod are retaining means divided into two parts 50 and 51. The retaining means 50 and 51 fit into a suitable recess in the rod 10 and are provided on their inner side with circular bearing surfaces permitting the bearing member to turn freely therein. A wedge member 52, similar to the wedge member 33, already described, is employed for drawing the parts 50 and 51 closer together.

With this form of my invention, instead of employing a second wedging means for adjusting the parts 50 and 51, to permit further freedom of the bearing member 14, I employ liners 53—53 and 54—54 between coacting faces of the parts 50 and 51. The liners 53—53 and 54—54 are preferably welded to the faces of the parts 50 and 51 to insure their permanence in place.

In adjusting this form of bearing structure, the proper clearance for the bearing member 14 is first determined, liners of the required thickness are selected to provide the proper clearance and are welded to the parts 50 and 51 and the whole is assembled. After assembly the parts 50 and 51 are tightly wedged together by the wedge 52. When wear of the bearing member 14 occurs, one or more liners 53 and 54 is removed and the parts 50 and 51 again adjusted.

Referring to Fig. 5, I show a connecting rod 60 having an end strap 61 secured thereto as by bolts 62—62. The strap 61 forms a recess for the bearing member 14 such as illustrated in previous embodiments. With this form of my invention the inside of the outer end of the strap 61 may conveniently be machined to form a bearing surface to cooperate with the outer bearing surface of the bearing member 14 and thus forms one part of the bearing member retaining means. Inserted in the recess formed by the strap 61 is a movable retaining member 63 having an inner bearing surface for the bearing member 14. Adjustments of the movable retaining member 63 and bearing member 14 may be made by a wedge member 64. In order to prevent a closing in of the retaining member 63 when heated, I provide a shoulder 66 on the strap 61 and provide a tongue or extension 67 on the retaining member 63 and overlapping the shoulder 66.

From the foregoing it will be apparent that I have devised an improved crank pin and connecting rod bearing effective to permit an even wearing of the bearing surfaces without getting out of round, and have provided means for the adjustment of said bearing member.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a connecting rod bearing for a crank pin, a divided bearing member having a circular outer surface, retaining means having at least one movable part with arms partially embracing the bearing member and having a curved inner surface fitting the outer surface of the bearing member whereby said bearing member is free to turn in the retaining means, means for varying the position of the movable part of the retaining means longitudinally of the connecting rod to compensate for wear of the bearing member, and means carried by the arms of the movable part of the retaining means and cooperating with a stationary part for preventing the arms from closing inwardly of the crank pin.

2. In a connecting rod bearing for a crank pin, a divided bearing member having inner and outer bearing surfaces, retaining means having at least one movable part with arms partially embracing the bearing member and having an inner bearing surface cooperating with the outer bearing surface of the bearing member and permitting it to turn therein, means for adjustably moving the movable part of the retaining means longitudinally of the connecting rod to secure proper adjustment of the bearing member, means fixing the position of the movable part of the retaining means after adjustment, and fingers on the arms overlapping a stationary part for holding said arms outwardly of the bearing member.

3. The combination with a crank pin and a connecting rod, of a divided bearing member therefor having an inner and an outer circular bearing surface, a recess being provided in the connecting rod for the bearing member, retaining means having a movable part and a fixed part interposed in the recess between the connecting rod and the bearing member for holding said bearing member in place, said movable part having a pair of arms partially embracing the bearing member and having inner bearing surfaces permitting said bearing member to turn therein, wedge means cooperating between the connecting rod and the retaining means for adjustably moving the movable part of said retaining means closer to the fixed part in the connecting rod, and figures on the extremities of each of the arms and overlapping the fixed part of the retaining means for constraining said arms outwardly of the bearing member.

4. The combination with a crank pin and a connecting rod, of a divided bearing member therefor having circular inner and outer bearing surfaces, a recess being provided in the connecting rod and having plane inner surfaces, movable retaining means fitting within the recess and having arms partially embracing the bearing member, said retaining means having a circular inner bearing surface conforming to the outer bearing surface of the bearing member permitting said bearing member to turn with respect thereto and around the crank pin, wedge means cooperating between the connecting rod and the retaining means for adjustably moving said retaining means toward the bearing member, other means cooperating between the retaining means and the connecting rod for moving said retaining means away from the bearing member, means for locking both the wedge means and the retaining means in position after adjustment, and fingers provided on the extremities of the arms and overlapping a fixed part for preventing a closing in of the arms of the retaining means on the bearing member.

5. The combination with a crank pin and a connecting rod, of a divided bearing member therefor having circular inner and outer bearing surfaces, a recess being provided in the connecting rod and having plane inner surfaces, divided retaining means within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, means carried by one part of the retaining means embracing the closure member, and an adjusting screw carried by said last mentioned means and bearing against the closure member effective to move the parts of the retaining means farther apart.

6. The combination with a crank pin and a connecting rod, of a divided bearing member therefor having circular inner and outer bearing surfaces, a recess being provided in the connecting rod and having plane inner surfaces, divided retaining means fitting within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, a strap formed on one part of the retaining means and embracing the closure member, and adjusting means coacting between the strap and the closure member effective for adjustably moving the parts of the retaining means farther apart.

7. The combination with a crank pin and a connecting rod, of a divided bearing member therefor having circular inner and outer bearing surfaces, a recess being provided in the connecting rod and having plane inner surfaces, divided retaining means fitting within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, a strap formed on one part of the retaining means and embracing the closure member, an adjusting screw extending through the strap and bearing on the closure member effective for adjustably moving the parts of the retaining means farther apart, means for locking both the wedge means and the strap in position after adjustment, and a tongue and recess connection between the parts of the retaining means for preventing said retaining means from closing in on the bearing member transversely of the connecting rod and the crank pin.

In testimony whereof, I have hereunto subscribed my name this fifteenth day of February, 1926.

CHARLES J. SCUDDER.

face of the bearing member permitting said bearing member to turn with respect thereto and around the crank pin, wedge means cooperating between the connecting rod and the retaining means for adjustably moving said retaining means toward the bearing member, other means cooperating between the retaining means and the connecting rod for moving said retaining means away from the bearing member, means for locking both the wedge means and the retaining means in position after adjustment, and fingers provided on the extremities of the arms and overlapping a fixed part for preventing a closing in of the arms of the retaining means on the bearing member.

5. The combination with a crank pin and a connecting rod, of a divided bearing member therefor having circular inner and outer bearing surfaces, a recess being provided in the connecting rod and having plane inner surfaces, divided retaining means within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, means carried by one part of the retaining means embracing the closure member, and an adjusting screw carried by said last mentioned means and bearing against the closure member effective to move the parts of the retaining means farther apart.

6. The combination with a crank pin and a connecting rod, of a divided bearing member therefor having circular inner and outer bearing surfaces, a recess being provided in the connecting rod and having plane inner surfaces, divided retaining means fitting within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, a strap formed on one part of the retaining means and embracing the closure member, and adjusting means coacting between the strap and the closure member effective for adjustably moving the parts of the retaining means farther apart.

7. The combination with a crank pin and a connecting rod, of a divided bearing member therefor having circular inner and outer bearing surfaces, a recess being provided in the connecting rod and having plane inner surfaces, divided retaining means fitting within the recess and surrounding the bearing member, said retaining means having a circular inner bearing surface conforming to the outer bearing surface of the bearing member permitting said bearing member to turn therein, wedge means cooperating between the connecting rod and one side of the retaining means for adjustably moving the parts of said retaining means closer together, a closure member for the recess in the connecting rod, a strap formed on one part of the retaining means and embracing the closure member, an adjusting screw extending through the strap and bearing on the closure member effective for adjustably moving the parts of the retaining means farther apart, means for locking both the wedge means and the strap in position after adjustment, and a tongue and recess connection between the parts of the retaining means for preventing said retaining means from closing in on the bearing member transversely of the connecting rod and the crank pin.

In testimony whereof, I have hereunto subscribed my name this fifteenth day of February, 1926.

CHARLES J. SCUDDER.

Certificate of Correction.

Patent No. 1,619,588.            Granted March 1, 1927, to

CHARLES J. SCUDDER.

It is hereby certified that error appears in the printed specification of the above-numbered patent requiring correction as follows: Page 3, line 116, claim 3, for the word "figures" read *fingers;* and that the said Letters Patent should be read with this correction therein that the same may conform to the record of the case in the Patent Office.

Signed and sealed this 29th day of March, A. D. 1927.

[SEAL.]
                               M. J. MOORE,
*Acting Commissioner of Patents.*

Certificate of Correction.

Patent No. 1,619,588. Granted March 1, 1927, to

CHARLES J. SCUDDER.

It is hereby certified that error appears in the printed specification of the above-numbered patent requiring correction as follows: Page 3, line 116, claim 3, for the word "figures" read *fingers;* and that the said Letters Patent should be read with this correction therein that the same may conform to the record of the case in the Patent Office.

Signed and sealed this 29th day of March, A. D. 1927.

[SEAL.]
M. J. MOORE,
*Acting Commissioner of Patents.*